P. MUELLER.
WATER STRAINER.
APPLICATION FILED DEC. 19, 1919.

1,370,147.

Patented Mar. 1, 1921.
2 SHEETS—SHEET 1.

Witness
Chas. L. Griestauer

Inventor
Philip Mueller,
By [signature]
Attorneys

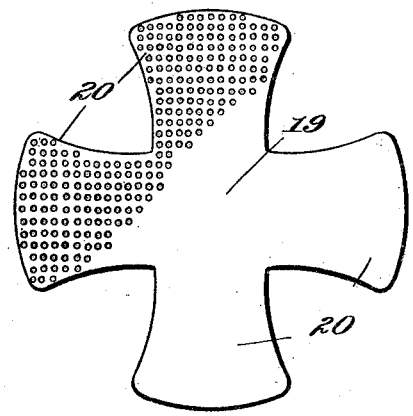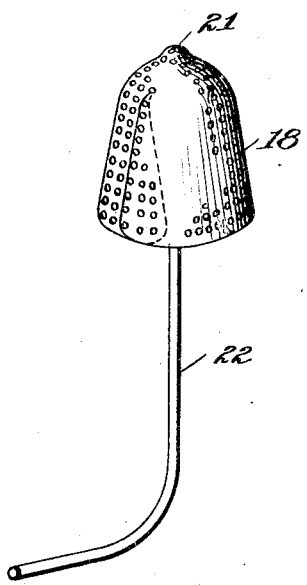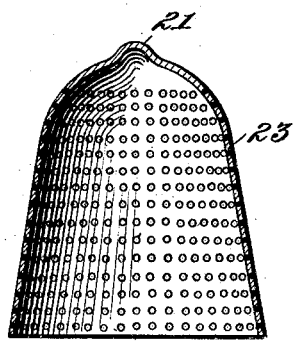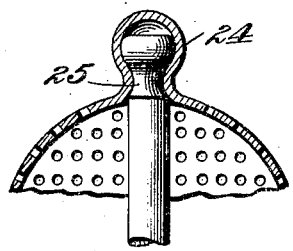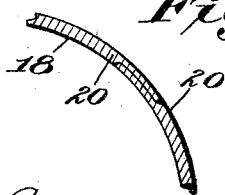

UNITED STATES PATENT OFFICE.

PHILIP MUELLER, OF DECATUR, ILLINOIS, ASSIGNOR TO ADOLPH MUELLER, TRUSTEE, OF DECATUR, ILLINOIS.

WATER-STRAINER.

1,370,147. Specification of Letters Patent. Patented Mar. 1, 1921.

Application filed December 19, 1919. Serial No. 345,929.

*To all whom it may concern:*

Be it known that I, PHILIP MUELLER, a citizen of the United States, and residing at Decatur, in the county of Macon and State of Illinois, have invented new and useful Improvements in Water-Strainers, of which the following is a specification.

This invention relates to water purification and has particular reference to water strainers of the general type disclosed in Letters Patent to Henry Mueller 894,035, granted July 21, 1908.

It is a purpose of this invention to provide in strainers of this type certain improvements which increase the efficiency of the strainers in operation, facilitate the assembling and disassembling of the screen from its casing, and prolong the life of the filtering strainer. My improved strainer is of simplified construction, may be manufactured at a minimum cost, and is relatively strong in structure.

In the following description of the present preferred embodiment of this invention, the above and other various objects and advantages of this invention will be more clearly brought out, the same being shown in the accompanying drawings, wherein:

Fig. 3 is a plan view of one form of blank from which the screen of the strainer may be constructed.

Fig. 4 is a side elevational view of my improved screen attached to the rod which maintains the screen in position in the casing.

Fig. 5 is a sectional view of a screen made of a single piece of metal drawn to shape and then perforated.

Fig. 6 is a sectional view showing the lapped joint of the meeting edges of the screen blank leaves of Fig. 3.

Fig. 7 shows another method of securing the screen to the retaining rod.

Figure 1:
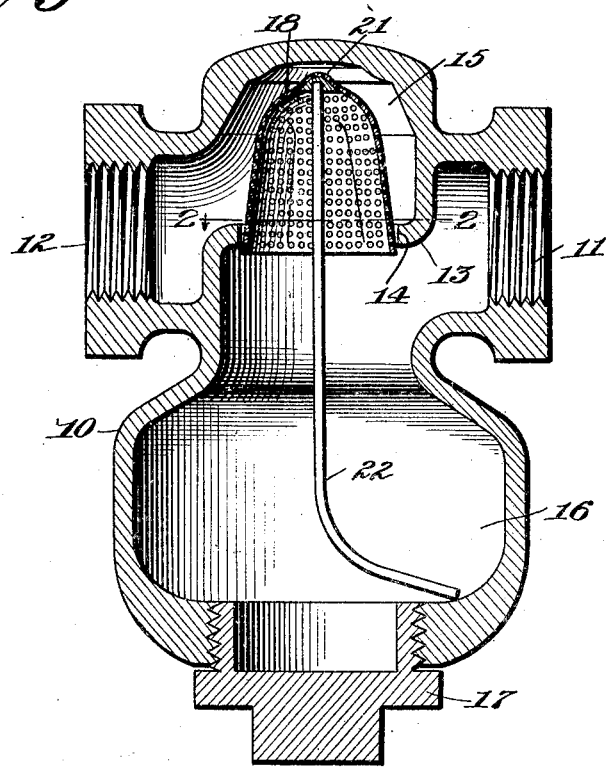
Figure 1 is a vertical sectional view taken centrally through my improved strainer.
Figure 2:
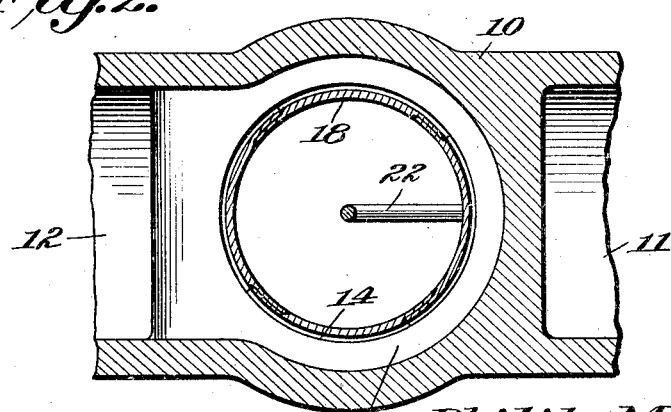
Fig. 2 is a transverse sectional view taken on line 2—2 of Fig. 1.

Referring to the drawings, wherein like numerals represent like parts in the several views, 10 designates a casing or body which may be of any approved construction, the same being illustrated, in the present instance, as having a through passage leading from the inlet opening 11 to the outlet opening 12. The through passage is interrupted by a partition 13, the horizontal portion of which is provided with a circular opening 14 above which the casing is somewhat dome-shaped to form a screen chamber 15.

Depending immediately beneath the opening in the partition 13 is an enlarged sediment chamber 16 having in its lower wall a threaded opening arranged concentrically to the opening 14 and adapted to be closed by an internally recessed screw plug 17.

When the casing 10 is interposed in a pipe system, the water passes from the source of supply into the inlet passage 11 through the opening 14 in the partition 13 and out through the outlet passage 12. To filter sand, dirt, and other foreign particles of solid matter from the water, a screen is positioned in the opening 14 of the partition 13, and heretofore it has been customary to make this screen of cylindrical form. It has been usual to closely fit the lower end of the cylindrical screen in the opening of the partition and the upper end of the screen in a recess in the top of the casing above the partition so as to prevent lateral movement of the screen.

It has been found, however, that after the strainer is in use for some time, corrosion takes place, causing the screen to stick to the surface of the casing contacting therewith so that considerable difficulty in removing the screen from position within the casing for the purpose of cleaning, repair, or renewal, is experienced. This is especially true, as the opening through the partition is cylindrical in form and corresponds to the cross section of the screen, and the areas of the contacting surfaces are relatively large. Furthermore, corrosion of the screen above the partition often makes it necessary to mutilate the screen before it can be removed. It is also found that, in the use of the cylindrical screen, sediment accumulates on the interior walls thereof and interferes with the flow of water through the strainer.

The above and other disadvantages experienced in the use of cylindrical screens are overcome by providing a screen which, as shown in Fig. 4 is somewhat conical in form. The screen is slightly larger at its base or open end than the opening in the partition and tapers toward its upper end.

Preferably, my improved screen 18 is constructed from a single blank of perforated sheet metal having a central portion and a plurality of radiating wings or leaves. The blank shown in Fig. 3 resembles a Maltese cross, in that it has a central portion 19 and four wings or leaves 20; but it is to be understood that the screen may be made up from a blank having more or less than four leaves. Preferably, each of the wings or leaves increase in width toward its outer end so that, when the screen is finally formed, the leaves will overlap. The outer edges of the leaves are rounded so that they will all lie in the same plane when the leaves are bent to form the finished screen.

The screen may be formed with an ordinary punch and in one operation which materially reduces the cost of manufacture. In forming a cylindrical screen it is necessary to cut away a portion of perforated metal, form it into a cylinder and then secure the edges of the screen in place.

In forming my improved screen from the blank, the leaves are bent toward each other about a mandrel with the corresponding edge of each leaf overlapping the adjacent edge of the next leaf. The leaves, when in this position, are subjected to great pressure so that the metal of the walls of the strainer is spread to a uniform thickness. By constructing the strainer in the manner described, the leaves reinforce each other and a strainer of considerable strength is obtained.

The top or closed end of the screen is dented at a central point, as at 21, so as to provide a small centrally disposed recess or indentation for the reception of one end of a rod 22 which retains the screen in position.

The upper end of the retaining rod 22 engages in the recess in the top of the screen and the rod is bent at its lower end so as to engage upon the annular shoulder about the opening in the lower wall of the sediment chamber 16. The rod 22 is sufficiently resilient to yieldably maintain the screen in place in the opening 14.

Preferably, the upper end of the rod 22 is held in place within the recess of the indentation 21 by means of solder or the like. The manner of attaching the rod 22 to the screen 18 is of considerable value from a manufacturing standpoint, as the operation of soldering is readily and quickly carried out, it being only necessary to invert the screen, place the end of the rod within the recess of the closed end thereof and then allow a drop or two of solder to fall into the recess and this operation is so simple that a boy having little experience may assemble a large number of rods and screens in a relatively short time.

It will be noted from the drawings that when the screen is in place within the casing the walls of the screen have but a line contact with the casing, the line of contact being between the lower edge of the opening 14 and the periphery of the screen adjacent its open end. Since contact between the screen and the walls of the casing is substantially limited to a line, corrosion of the parts does not securely bind the screen to the casing; and as the screen tapers toward its closed end, which end is first inserted into the opening 14, corrosion of the screen above the partition does not affect removal of the screen. Furthermore, since the screen tapers toward its upper end, the walls thereof are inclined at an angle to the vertical, and any sediment which might tend to accumulate on the interior walls of the screen will drop, due to gravity, into the sediment chamber. It will be observed that, owing to the conical shape of the screen, pressure from below tends to wedge it to its seat in the opening 14 and maintain always a close contact of the screen to its seat. In producing these screens it is impracticable to make them identical in diameter so that when seated, as described, in the opening 14 their projection into the chamber 15 may vary slightly. I make the chamber 15, therefore, of a length which will permit the screen to be completely seated in opening 14, but will not, however, allow it to be thrust completely through the opening, which would, of course, result in the screen being trapped in the chamber 15 and necessitate destroying it to remove it, with the danger of some of the broken parts getting into the line. As shown in Fig. 1 there is clearance or head-room at the top of the chamber 15 for the screen, and yet it will be effectively stopped from being thrust through the opening 14 and completely into chamber 15, this being prevented by the top of the chamber serving as a stop for the screen.

It is to be noted that by connecting the retaining wire or rod 22 to the screen 18 in the manner described, there is no danger of the rod being forced out of place by the pressure of the spring portion of the wire. The recess in the bulged portion 21 forms a pocket in which the solder and upper end of the rod 22 are firmly seated, and therefore, the adhesive power of the solder is not solely relied upon to maintain the wire or rod 22 in place.

In Fig. 5 I have shown the screen as formed in a manner slightly different from that heretofore described. In this form the screen is drawn from a blank 23 instead of being stamped out, and, after it is brought to proper shape is perforated; it being impracticable to perforate and then draw a blank because of the danger of distorting the perforations.

In Fig. 7 the screen 18 is secured to the retaining rod 22 by crimping or spinning the tip 24 into a groove 25 formed in the rod, so as to lock the parts together.

Such changes as are within the range of mechanical skill may be made without departing from the spirit of my invention.

What I claim is:—

1. A liquid strainer comprising a casing having a through passage, a partition in said passage having an opening therethrough, a sediment chamber beneath said partition, a screen chamber above said partition, and a screen having its upper end closed and tapering toward said end, said screen being mounted within said opening and having only a line contact with the wall thereof.

2. A liquid strainer comprising a casing having a through passage, a partition in said passage having a cylindrical opening therethrough, a sediment chamber beneath said partition, a screen chamber above said partition, a downwardly-flaring conical screen mounted in said opening and having a line contact with the walls thereof, and means for maintaining the screen in position.

3. A liquid strainer comprising a casing having a through passage, a partition in said passage having an opening therethrough, a sediment chamber on one side of said partition, a screen chamber on the other side of said partition, a screen mounted in said opening and having a closed end provided with a recess, and a retaining rod having one end located within said recess.

4. A liquid strainer comprising a casing having a through passage, a partition in said passage having an opening therethrough, a sediment chamber beneath said partition, a screen chamber above said partition, a screen mounted in said opening and having its upper end closed and provided with a recess, a rod engaging at one end in said recess and at the other end against said casing, and means for securing the upper end of the rod in said recess.

5. A liquid strainer comprising a casing having a through passage, a partition in said passage having an opening therethrough, a sediment chamber beneath said partition, a screen chamber above said partition, a conical screen mounted in said opening and having its upper end closed and provided with a recess, a resilient rod engaging at one end in said recess and at the other against the casing, and a cohering material for securing the upper end of the rod in said recess.

6. A liquid strainer comprising a casing having a through passage, a partition in said passage having an opening therethrough, a sediment chamber beneath said partition, a screen chamber above said partition, a downwardly-flaring conical screen mounted in said opening and having a line contact therewith only, said screen having a closed upper end provided with a centrally disposed recess and spaced from the walls of the casing, a resilient rod engaging at one end in said recess and at the other against the casing, and solder or similar material in said recess for securing the upper end of the rod to said screen.

7. A liquid strainer comprising a casing having a through passage, a partition in said passage having an opening therethrough, a screen-receiving chamber of a length to accommodate slightly different lengths of screens, and a substantially conical screen seated in said opening and projecting into said chamber.

8. A liquid strainer comprising a casing having a through passage, a partition in said passage having an opening therethrough, a screen seating in line contact with said opening, and a screen-receiving chamber of a length sufficient to permit seating of said screen, but less in length than the said screen to prevent the screen being thrust completely through the opening.

In testimony whereof I have hereunto set my hand.

PHILIP MUELLER.